United States Patent
Cam et al.

(10) Patent No.: US 12,330,375 B2
(45) Date of Patent: Jun. 17, 2025

(54) COLLISION AVOIDANCE IN THREE-DIMENSIONAL PRINTING

(71) Applicant: Ai Build Limited, London (GB)

(72) Inventors: Daghan Cam, London (GB); Michail Desyllas, London (GB)

(73) Assignee: AI BUILD LIMITED, London (GB)

( * ) Notice: Subject to any disclaimer, the term of this patent is extended or adjusted under 35 U.S.C. 154(b) by 572 days.

(21) Appl. No.: 17/596,487

(22) PCT Filed: Jun. 10, 2020

(86) PCT No.: PCT/GB2020/051396
§ 371 (c)(1),
(2) Date: Dec. 10, 2021

(87) PCT Pub. No.: WO2020/249941
PCT Pub. Date: Dec. 17, 2020

(65) Prior Publication Data
US 2022/0314549 A1    Oct. 6, 2022

(30) Foreign Application Priority Data

Jun. 12, 2019 (GB) ..................... 1908417

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B33Y 10/00* (2014.12); *B33Y 50/02* (2014.12)

(58) Field of Classification Search
CPC ... B29C 64/118; B29C 64/386; B29C 64/393; B33Y 50/00; B33Y 50/02
See application file for complete search history.

(56) References Cited

U.S. PATENT DOCUMENTS

| 2015/0035198 | A1 | 2/2015 | Saba |
| 2015/0321418 | A1* | 11/2015 | Sterman .............. B29C 64/393 264/210.1 |

(Continued)

FOREIGN PATENT DOCUMENTS

| CN | 108748977 A | 11/2018 |
| WO | 2016040507 A1 | 3/2016 |
| WO | 2017181151 A1 | 10/2017 |

OTHER PUBLICATIONS

GB Combined Search and Examination Report under Section 17 and 18 (3) received for GB Application 1908417.7 dated Sep. 10, 2019. 3 pages.

(Continued)

*Primary Examiner* — Andrew L Swanson
(74) *Attorney, Agent, or Firm* — Finch & Maloney PLLC

(57) ABSTRACT

A method of three-dimensional printing, the method comprising: printing an initial portion of material from a starting point; pausing printing of the initial portion of material so as to form a first anchor point, such that a first direction is defined from the starting point to the first anchor point, and wherein the anchor point lies in a plane substantially perpendicular to the first direction such that the initial portion of material is on the printed side of the plane; resuming printing from the first anchor point by printing, from the first anchor point, one or more intermediate portions of material on the non-printed side of the plane; printing a final portion of material to a second anchor point on the printed side of the plane.

12 Claims, 7 Drawing Sheets

(51) Int. Cl.
    *B33Y 10/00*          (2015.01)
    *B33Y 50/02*          (2015.01)

(56) References Cited

U.S. PATENT DOCUMENTS

| | | | |
|---|---|---|---|
| 2017/0087767 A1* | 3/2017 | Grewell | B29C 64/118 |
| 2017/0248937 A1* | 8/2017 | Guimbretiere | G05B 19/4099 |
| 2019/0283329 A1* | 9/2019 | Lensgraf | B29C 64/40 |
| 2019/0322037 A1* | 10/2019 | Howe | B29C 64/209 |
| 2022/0072764 A1* | 3/2022 | Wood | B29C 64/295 |

OTHER PUBLICATIONS

International Search Report and Written Opinion received for PCT/GB2020/051396 Mailed Sep. 11, 2020. 13 pages.
GB Examination Report under Section 18 (3) received for GB Application 1908417.7 dated Sep. 10, 2019. 3 pages.
"3D Print Bridging: Easy Tips and Tricks for Perfect Bridges" by Tobias Hullette published on Mar. 7, 2019 downloaded https://all3dp.com/2/bridging-3d-printing-tips-tricks-for-perfect-bridges/.

* cited by examiner

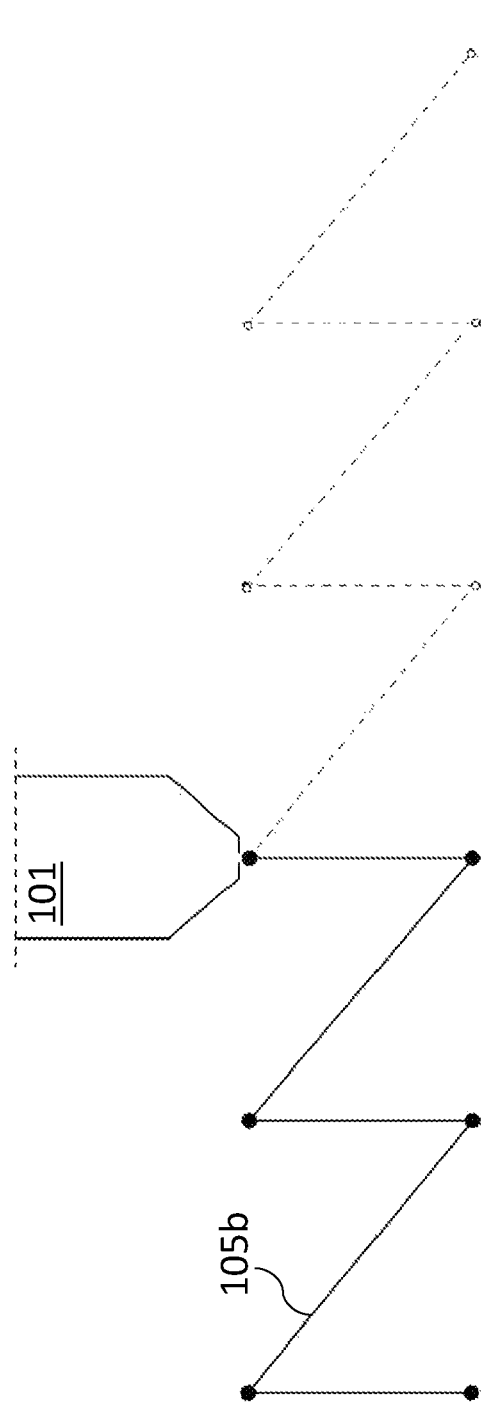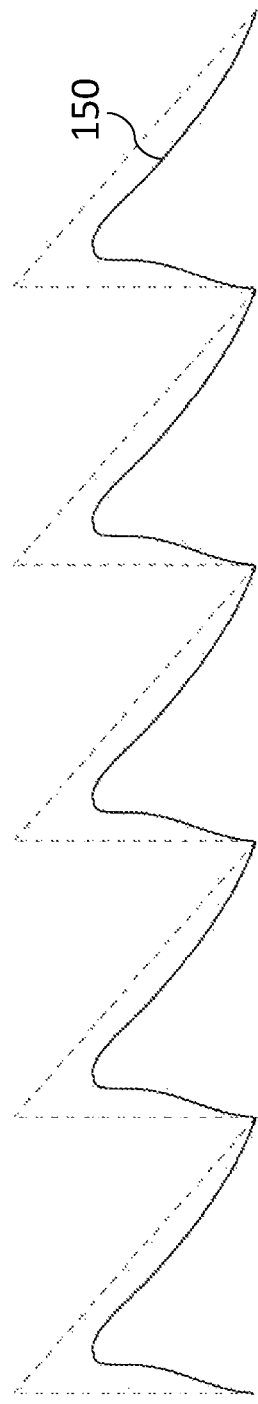

COLLISION AVOIDANCE IN THREE-DIMENSIONAL PRINTING

CROSS-REFERENCE TO RELATED APPLICATIONS

This application claims priority under 35 U.S.C. § 371 as a national stage application of PCT Application No. PCT/GB2020/051396, filed Jun. 10, 2020, which claims priority to GB 19808417.7, filed Jun. 12, 2019, each of which is hereby incorporated herein by reference in its entirety.

BACKGROUND

The present invention relates to a method of three-dimensional printing. In particular, the present invention relates to an improved method of wire frame printing.

Wire frame printing is a three-dimensional printing technique. Wire frame printing can be used to fabricate entire three-dimensional objects, or as part of a multi-discipline three-dimensional printing process so as to fabricate sections of a scaffolding-like frame that provide support for a three-dimensionally printed object.

Wire frames are constructed by extruding and depositing sections of printing material. Typically, a section of printed material is linear. In order to construct a wire frame structure, a series of printed sections are deposited. The series of sections may be deposited in any order. One difference between wire frame three-dimensional printing and typical layer-by-layer three-dimensional printing is that during wire frame printing the sections of printed material can be extruded and solidified in three-dimensional space without relying on a previous layer supporting each printed section along its full length. That is, printed sections can be deposited in any three-dimensional orientation. This is in contrast to layer-by-layer printing, in which printing is constrained to building up layers in successive horizontal planes. During wire frame printing, sections of material can be printed from a previously printed point into a point in space, or between two previously printed points.

FIG. 1 depicts the stages of one exemplary wire frame printing process. Other wire frame printing processes exist. The exemplary wire frame printing process alternates between first and second printing stages. In a first stage, a contour layer 20 is printed. The contour layer 20 may be a horizontal layer. In a second stage, a zig-zag type pattern layer 21 is printed on top of the contour layer 20. The zig-zag type pattern layer 21 may extend substantially vertically. The exemplary wire frame printing process then returns to the first stage, and prints a further contour layer 22 supported by the apexes of the zig-zag type pattern layer 21. Wire frame printing can be performed by an articulated robot arm 310, an example of which is shown in FIG. 4 printing a wire frame structure 308.

Wire frame printing processes typically suffer from problems caused by the printhead colliding with previously printed material.

For example, FIG. 2 depicts a cross-sectional view of a typical wire frame printhead 101 having printed a vertical section 104 of the zig-zag type pattern layer 21. Filament 103 is drawn 102 into the printhead 101. The printhead heats the filament 103 using heater 115 so that it can be extruded and deposited. In order to form the zig-zag type pattern layer 21, a vertical section of material 104 (also shown in FIG. 1) is deposited. The printhead 101 then moves in direction 105a so as to print a section of material 140 (shown in FIG. 1) in direction 105b. Printheads are typically configured to print section of material 140 by following direction 105b because this is the shortest and most direct route between points in the zig-zag type pattern layer 21. However, in doing so, the apex 107 of previously printed filament 104 will collide with the printhead 101—for example, at corner 106. This is because the nozzle of the printhead 101 has a non-zero width.

Collisions of this type limit the accuracy and fidelity of typical wire frame printing techniques. For example, as shown in FIGS. 3a and 3b, if a printhead 101 follows a typical printing path 105b, the resulting wire frame 150 is distorted. This is because the printhead 101 impinges on each of the apexes of the previously printed vertical sections of material of the zig-zag type pattern layer 21. In this way, it is not possible to form sharp apexes—and so the accuracy and fidelity of the zig-zag type pattern layer 21 is compromised. This compromises the deposition of the next contour layer 22, as the apexes of the zig-zag type pattern layer 21 are poorly defined. This problem is compounded the more layers a wire frame structure comprises.

There is a need for an improved method of wire frame printing.

SUMMARY OF THE INVENTION

According to a first aspect of the present invention there is provided method of three-dimensional printing, the method comprising: printing an initial portion of material from a starting point; pausing printing of the initial portion of material so as to form a first anchor point, such that a first direction is defined from the starting point to the first anchor point, and wherein the anchor point lies in a plane substantially perpendicular to the first direction such that the initial portion of material is on the printed side of the plane; resuming printing from the first anchor point by printing, from the first anchor point, one or more intermediate portions of material on the non-printed side of the plane; printing a final portion of material to a second anchor point on the printed side of the plane.

Material may be printed by a printhead configured to move relative to the material at a printhead speed and extrude material at an extruding speed, the printhead speed and the extruding speed being independently variable.

The average printhead speed may be greater than the average extruding speed for the period of time during which the intermediate and final portions of material are printed between the first and second anchor points.

The printhead and extruding speeds may be constant when printing the intermediate and final portions of material between the first and second anchor points.

The method may further comprise: pausing the extrusion of material between the first and second anchor points whilst the printhead continues moving.

The printing of the first portion of material may be paused for a predetermined period of time.

The method may further comprise monitoring the temperature of the first anchor point when printing of the initial portion of material is paused; and printing one or more intermediate portions of material on the non-printed side of the plane after determining that the temperature of the first anchor point is below a threshold.

A thermal camera may be used to monitor the temperature of the first anchor point.

The first direction may be substantially vertical.

The method may further comprise cooling the first anchor point using one or more fans whilst printing is paused.

The method may further comprise: printing subsequent portions of material on an anchor point starting from a position offset from the centre of that anchor point.

Pausing printing of the initial portion of material so as to form a first anchor point may further comprise printing one or more other portions of material, remote from the first anchor point, before returning to the first anchor point so as to resume printing from the first anchor point.

According to a second aspect of the present invention there is provided a three-dimensional printing apparatus configured to perform any of the methods described herein.

According to a third aspect of the present invention there is provided a non-transitory computer readable storage medium having stored thereon computer readable instructions that, when executed at a three-dimensional printing apparatus, cause the three-dimensional printing apparatus to perform any of the methods described herein.

According to a fourth aspect of the present invention there is provided a computer program comprising computer program code means adapted to perform any of the methods described herein when said program is run on a programmable microcomputer.

BRIEF DESCRIPTION OF THE DRAWINGS

FIG. 3a shows a typical wire frame printing path.

FIG. 3b shows the typical results achieved by following a typical wire frame printing path.

DETAILED DESCRIPTION OF THE DRAWINGS

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 4:
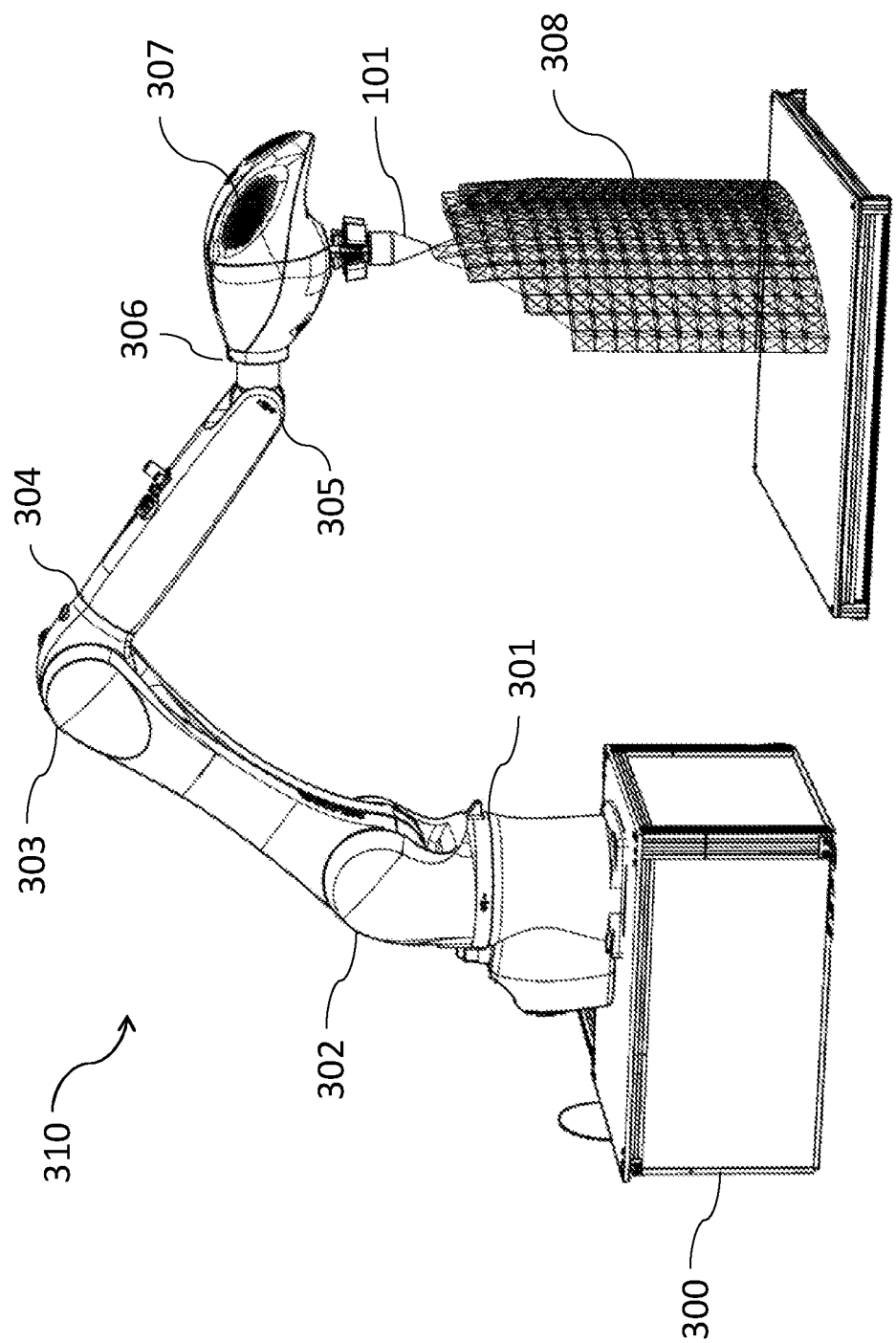
FIG. 4 shows an exemplary printing robot for wire frame printing.

Wire frame printing can be performed by an articulated robot arm 310, an example of which is shown in FIG. 4 printing a wire frame structure 308.

Articulated robot arm 310 comprises a base 300 and a series of joints 301, 302, 303, 304, 305, 306 and a printhead 101. The series of joints may comprise any appropriate joints, such as revolute joints. The series of joints can be manipulated so as to control the position and orientation of the printhead 101. The movement of articulated robot arm 310 via said series of joints can be controlled in accordance with principles well-known to the person skilled in the art.

Figure 1:
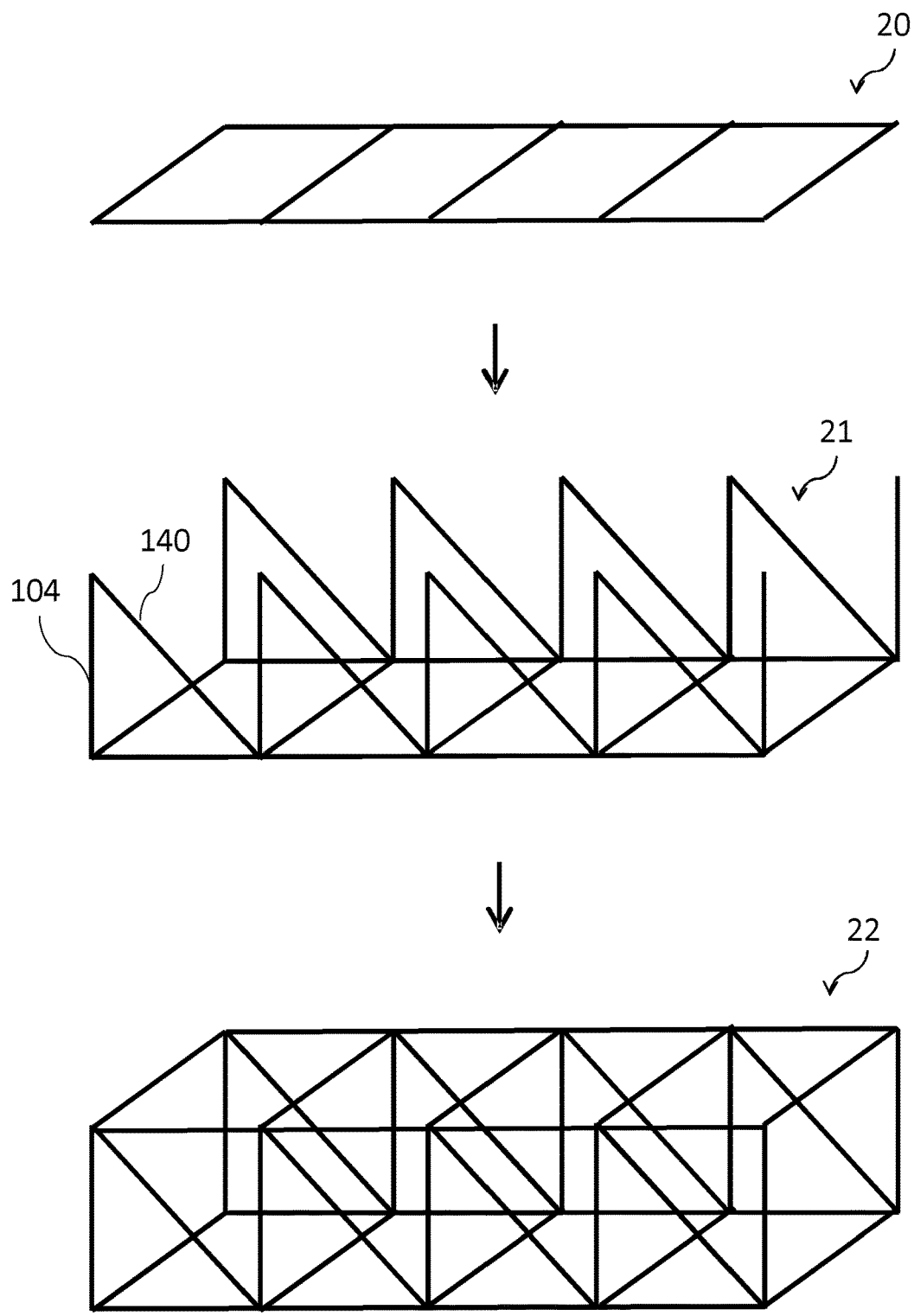
FIG. 1 shows the stages of a typical wire frame printing process.
Figure 2:
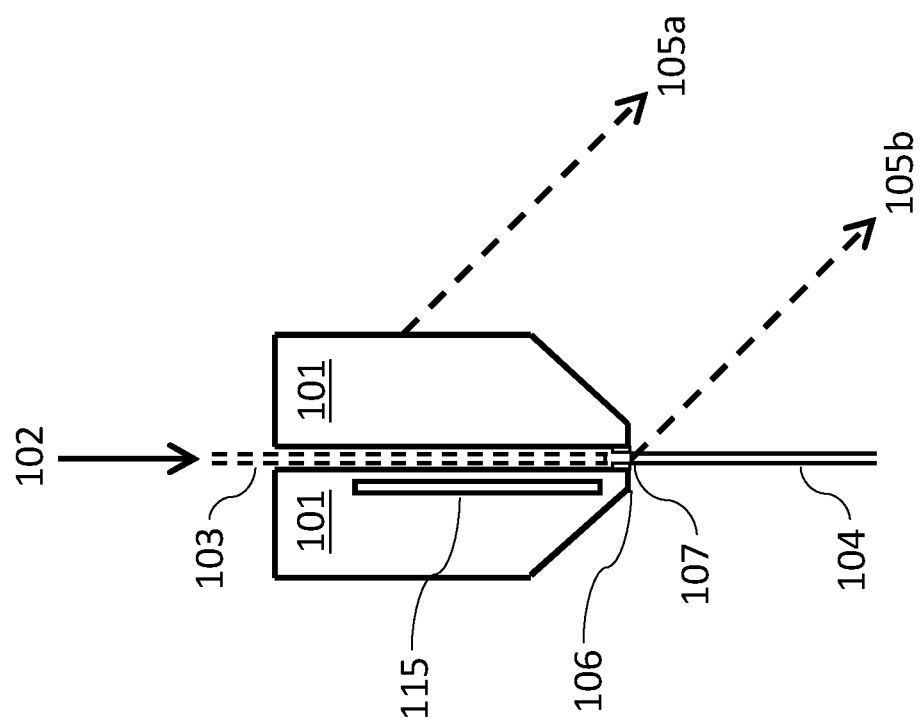
FIG. 2 shows a cross-sectional view of a typical wire frame printhead.

The articulated printing robot comprises a printhead 101. As described herein, FIG. 2 shows a cross-sectional view of a typical wire frame printhead 101. An exemplary wire frame printhead 101 may have approximate dimensions of 10 cm in height and 4 cm in width.

Filament 103 is drawn 102 into the printhead 101. The filament may be a thermo-plastic polymer material, such as polylactic acid (PLA), acrylonitrile butadiene styrene (ABS) or polyethylene terephthalate (PETG).

The printhead heats the filament 103 using heater 115 so that it can be extruded and deposited. Heating a thermoplastic polymer filament reduces its viscosity. This enables the filament to be extruded and deposited by the printhead. The printing temperature used depends on the thermo-plastic polymer to be printed. By way of example, the printhead may heat the filament to temperatures in the range of 190° C. to 240° C. As shown in FIG. 2, the exit diameter of the nozzle of printhead 101 may be smaller than the entrance diameter so as to compress the filament 103 as it is drawn through the printhead 101. This compression can aid in fully melting the filament.

In other examples, the printhead is fed by material in pellet form. The material in pellet form may be a thermoplastic polymer material, such as polylactic acid (PLA), acrylonitrile butadiene styrene (ABS) or polyethylene terephthalate (PETG). Material in pellet form can be drawn into the printhead and melted by the printhead in order to be deposited. The extrusion of thermo-plastic polymers provided in pellet form is well-understood by the skilled person.

The deposited section of material cools such that the printed material solidifies. One or more fans 307 can be provided on or above the printhead 101. The fans 307 may be directed towards the printed material so as increase the airflow impinging on the printed material in order to aid its cooling. The airflow generated by the fans may be balanced so as to avoid distorting printed material. The fans may be in operation continually during printing. Alternatively, the fans 307 may operate intermittently. Operating the fans intermittently may increase energy efficiency.

The printhead 101 may be moved by an articulated printing robot arm, as described with reference to FIG. 4. The printhead 101 is configured to move relative to the three-dimensional structure 308 at a printhead speed. The relative printhead speed may represent the distance covered by one part of the printhead, such as corner 106, per unit of time. In another example, the printhead 101 remains stationary and the printing bed 311 is actuatable so as to move the three-dimensional structure 308 relative to the printhead 101. The relative printhead speed may represent the distance covered by one part of the three-dimensional structure 308, relative to the printhead 101, per unit of time. In some examples, the printhead speed is variable. The relative printhead speed may be in the region of 10 to 30 millimetres per second. The relative printhead speed can be considered to be a printing parameter.

It is worth noting that the description uses the terms "relative printhead speed" and "printhead speed" interchangeably to refer to the same printing parameter.

As described herein, filament 103 is drawn as shown by arrow 102 into the printhead 101. The filament may be in the region of one to three millimetres in diameter. The filament may be drawn into the printhead by any means well known to the skilled person. For example, the printhead may comprise a motor configured to drive a set of wheels which drag the filament into the printhead by frictional contact. Material is extruded from the printhead. As described herein, the filament may be heated such that it can be extruded from the printhead. The printhead 101 is configured to extrude material at an extruding speed. The extruding speed may represent the length of material extruded by the printhead per unit of time. In some examples, the extruding speed is variable. The extruding speed may be in the region of 10 to 30 millimetres per second. In this way, the printhead may extrude thermo-plastic polymer at a rate in the region of one kilogram per hour.

The length of individual sections of printed material between anchor points of the wire frame structure may be in the region of 30 to 120 millimetres. An anchor point may be defined as a point in the wire frame structure at which a plurality of printed sections of material meet. The reason for limiting the length of individual sections of material is so that the bending moment applied to any individual section of the wire frame structure does not exceed a tolerable threshold.

It is to be understood that other three-dimensional printing devices could perform the methods disclosed herein. That is, the method need not be performed by an articulated printing robot, as described with reference to FIG. 4. For example, the methods described herein could be performed by a printhead configured to move in three dimensions via a set of three rails oriented in X, Y and Z directions.

Figure 5:
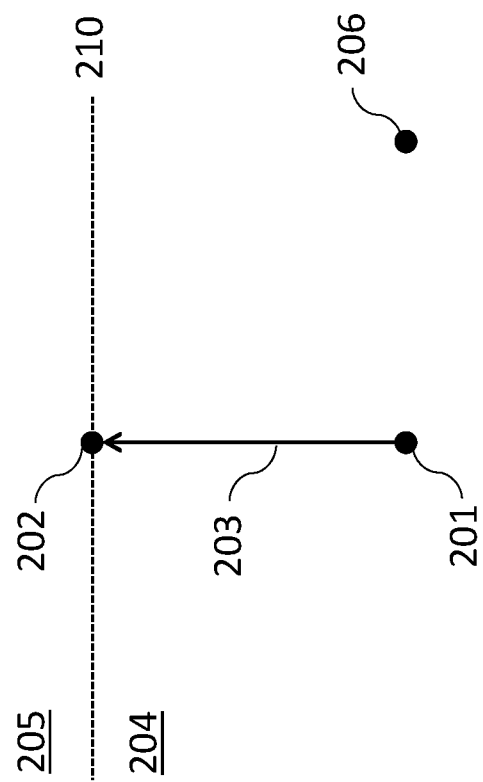
FIG. 5 shows the printing of a vertical section of a wire frame.

FIG. 5 shows the printing of a vertical section of the zig-zag type pattern layer 21 of a wire frame. Printing begins at a starting point 201. The starting point 201 may be an arbitrary point on a surface, a point on a previously printed contour layer 20, 22, or an apex of a previously printed zig-zag type pattern layer 21.

From the starting point 201, an initial portion of material is printed. The initial portion of material leads to a first anchor point 202. The initial portion of material may be a linear section of material directly from the starting point 201 to the first anchor point 202. Alternatively, the initial portion of material could be a non-linear section of material, or a plurality of sections of material.

A first direction 203 is defined from the starting point 201 to the first anchor point 202. The first direction 203 may be vertical, or substantially vertical. Substantially vertical may include angles 15° either side of vertical. Alternatively, the first direction 203 may be any other direction.

The anchor point 202 lies in a plane 210 perpendicular, or substantially perpendicular, to the first direction 203. Substantially perpendicular may include angles 15° either side of perpendicular. The initial portion of material is on the printed side 204 of the plane 210. The other side of the plane 210 may be referred to as the non-printed side 205 of the plane 210.

A second anchor point 206 is on the printed side 204 of the plane 210. In order to print the zig-zag type pattern layer 21, the printhead needs to extrude a section of material between the first anchor point 202 and the second anchor point 206. However, as described herein with reference to FIGS. 1, 2, 3a and 3b, if the printhead 101 follows a typical printing path directly between the first anchor point 202 and the second anchor point 206, the printhead, in particular corner 106, will collide with the first anchor point 202.

Figure 6B:
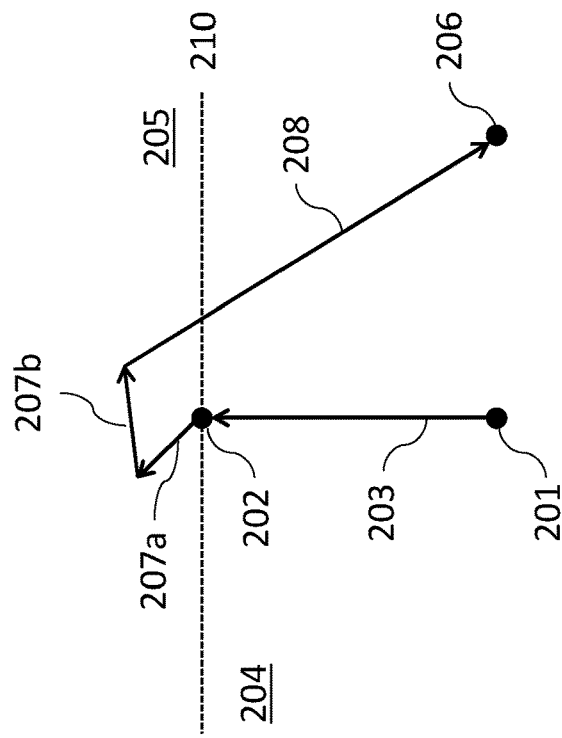
FIGS. 6a and 6b shows exemplary printing paths in accordance with the methods described herein.
Figure 6A:
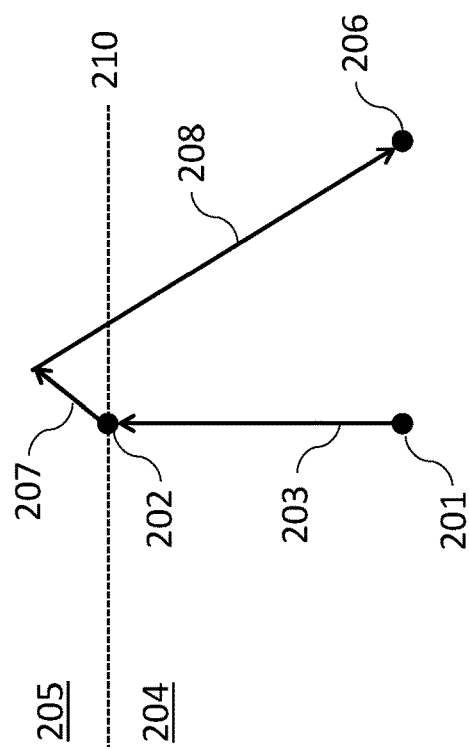

FIG. 6a shows an exemplary printing path in accordance with the methods described herein. It is worth noting that FIG. 6a depicts a path through which the printhead moves—rather than the form of the printed material itself. The starting point 201, first anchor point 202, first direction 203, plane 210, printed side of the plane 204, non-printed side of the plane 205, and second anchor point 206 are as described with reference to FIG. 5.

In accordance with the methods described herein, an initial portion of material is printed between the starting point 201 and the first anchor point 202. The printing process then pauses at the first anchor point 202. Pausing at the first anchor point 202 enables the initial portion of material to partially, or fully, solidify. Partially, or fully, solidifying increases the rigidity of initial portion of material. The increased rigidity of the initial portion of material enables the forces excreted during the printing method described herein to be tolerated.

The printing process may be paused for a pre-determined period of time. For example, the printing process may be paused for 15 to 45 seconds. In another example, a thermal camera can be mounted to the printhead. The thermal camera could be used to determine when the initial portion of material, or the first anchor point 202, has cooled below a threshold temperature. For example, the printing process could be paused until it is determined that the first anchor point 202 has cooled to a temperature below the glass transition temperature ($T_g$) of the printing material. During this time the printhead may act as a temporary anchor which supports the initial portion of material whilst it fully or partially solidifies.

When printing is paused, the printhead may remain static at or close to the first anchor point 202 after the first anchor point 202 has been printed. In other examples, when printing has been paused at the first anchor point 202, the printhead may print other sections of the wire frame structure before returning to the first anchor point 202. Said other sections may be remote from the first anchor point 202. That is, the printhead may jump to another anchor point in order to print sections of material. In order to jump to another anchor point, the printhead may first be held static at the first anchor point 202 for a pre-determined period of time. Said period of time may be 15 to 45 seconds. During this time the initial portion of material may solidify sufficiently such that when the printhead jumps to another location the initial portion of material separates from the heated filament inside the nozzle.

Printing is resumed from the first anchor point 202 by printing an intermediate portion of material in direction 207 on the non-printed side 205 of the plane 210. By printing the intermediate portion of material on the non-printed side 205 of the plane 210, a collision between the printhead 101 and the first anchor point 202 is avoided (this can be understood with reference to FIG. 2). A final portion of material is then printed in direction 208 to the second anchor point 206.

The intermediate portion of material may be a linear section of material. Alternatively, the initial portion of material could be a non-linear section of material. The final portion of material may be a linear section of material. Alternatively, the final portion of material could be a non-linear section of material. In some examples, the intermediate and final portions of material may be printed as one curved section of material.

In accordance with the method described with reference to FIG. 6a, the printhead may impinge on the intermediate portion of material whilst printing the final portion of material. However, this impingement may be beneficial, as it can be used to "flatten out" the angle between the intermediate and final portions of material. That is, the printhead may push on the angle between the intermediate and final portions of material so as to increase that angle. For example, the angle may be increased to 180°. This is possible because the intermediate and final portions of printed material are not able to solidify in the time it takes to print both portions. In this way, although the section of material deposited between the first and second anchor points is extruded in two portions, the resulting section of material may solidify as one linear section of material.

As described herein, the printhead speed and the extruding speed may be independently variable. The average printhead speed may be greater than the average extruding speed for the period of time during which the intermediate and final portions of material are printed between the first anchor point 202 and second anchor point 206. The purpose of these relative speeds is such that, in the time it takes the printhead to follow a printing path in directions 207 and 208 from the first anchor point 202, a length of material substantially matching the distance between the first anchor point 202 and second anchor point 206 is extruded. This is because the printhead travels a greater distance than the direct distance between the first anchor point 202 and the second anchor point 206—and it is not desirable to print more material than is required to bridge those points.

The relative speeds described herein can be achieved in many ways. One way of achieving these speeds is to print the intermediate and final portions of material using a constant printhead speed that is greater than the constant extruding speed used. Another way of achieving these speeds is to initially match the printhead speed and the extruding speed, and stop extruding material (e.g. by making the extruding speed equal to zero) prior to arriving at the second anchor point 206. A third way of achieving these speeds is to accelerate or decelerate either of the printhead speed or the extruding speed whilst printing the intermediate and final portions of material—such that, overall, the average printhead speed is greater than the average extruding speed.

The result of achieving these relative speeds is that the angle between the intermediate and final portions of material is "dragged out" by the movement printhead. That is, the printhead applies a tension force to the intermediate and final portions of printed material. The intermediate and final portions of material are of relatively low rigidity, when compared to the initial portion of material that has been allowed time to partially, or fully, solidify during the pause in printing. The angle between the intermediate and final portions of printed material accumulates the highest concentration of stress caused by the applied tension force. Therefore, the applied tension force acts increase the angle between the intermediate and final portions of material. For example, the angle may be increased to 180°. In this way, although the section of material deposited between the first and second anchor points is extruded in as intermediate and final portions, the resulting section of material may solidify as one linear section of material.

The first anchor point 202, formed in accordance with the method described with reference to FIG. 6a, may form the apex of a triangular section of the zig-zag type pattern layer 21.

FIG. 6b shows another exemplary printing path in accordance with the methods described herein. It is worth noting that FIG. 6b depicts a path through which the printhead moves—rather than the form of the printed material itself. The starting point 201, first anchor point 202, first direction 203, plane 210, printed side of the plane 204, non-printed side of the plane 205, and second anchor point 206 are as described with reference to FIG. 5.

An initial portion of material is printed between the starting point 201 and the first anchor point 202. As described herein, the printing process then pauses at the first anchor point 202.

Printing is resumed by printing two intermediate portions of material in directions 207a and 207b on the non-printed side 205 of the plane 210. By printing the two intermediate portions of material on the non-printed side 205 of the plane 210, a collision between the printhead 101 and the first anchor point 202 is avoided (this can be understood with reference to FIG. 2). A final portion of material is then printed in direction 208 to the second anchor point 206.

The intermediate portion of material may be a linear section of material. Alternatively, the initial portion of material could be a non-linear section of material. The final portion of material may be a linear section of material. Alternatively, the final portion of material could be a non-linear section of material. In some examples, the intermediate and final portions of material may be printed as one curved section of material.

In the example depicted in FIG. 6b, the final portion of material originates on the non-printed side 205 of the plane 210. In other examples, the final portion of material may originate on the printed side 204 of the plane 210.

The printhead speed relative to the extruding speed during the printing of the intermediate and final portions of material may be as described herein with reference to FIG. 6a.

Figure 7A:
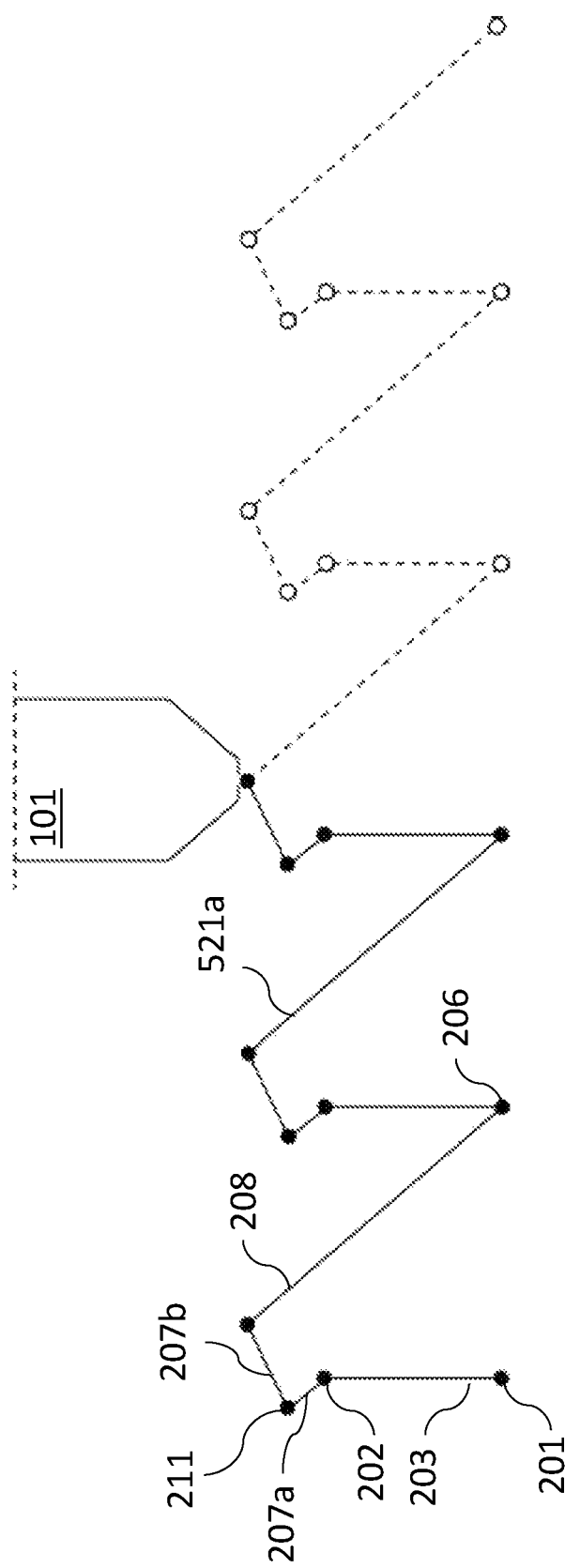
FIG. 7a schematically shows an exemplary printing path in accordance with the methods described herein.

FIG. 7a schematically shows an exemplary printing path 521a achieved by repeating the series of printing directions 203, 207a, 207b, and 208 as described with reference to FIG. 6b. It is worth noting that FIG. 7a depicts a path through which the printhead moves—rather than the form of the printed material itself.

An intermediate point 211, shown in FIG. 7a and formed in accordance with the method described with reference to FIG. 6b, may form the apex of a triangular section of the zig-zag type pattern layer 21. This is because the first intermediate portion of material is printed in a direction 207a away from the second anchor point 206. Therefore, the printhead 101 does not impinge on the first intermediate portion of material when printing the second intermediate portion of material in direction 207b (this can be understood with reference to FIG. 2). Thus, the angle between the first intermediate portion of material and the second intermediate portion of material is not "flattened out" as described herein. Thus, the intermediate point 211 can become the apex. The angle between the second intermediate portion and the final portion of material, printed in direction 208, is "flattened out" or "dragged out" as described herein.

Figure 7B:
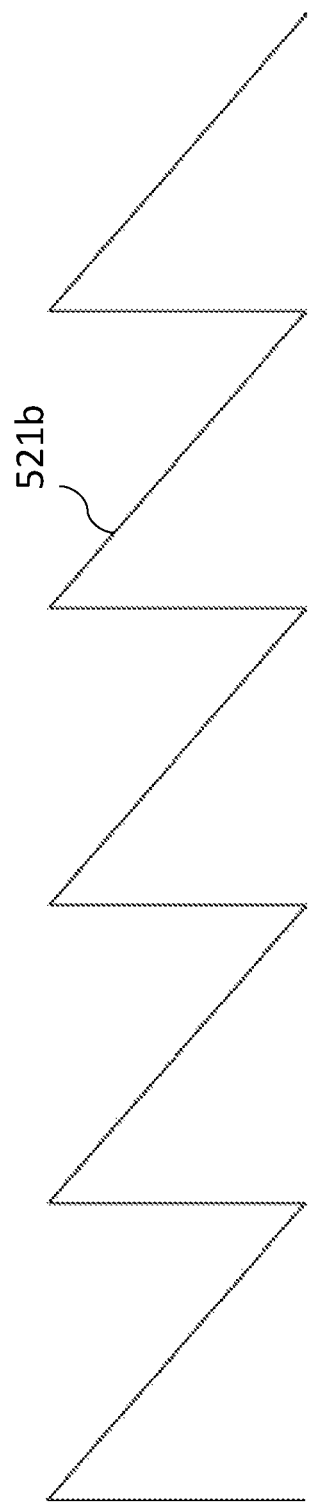
FIG. 7b schematically shows the expected result when printing using the exemplary printing path in accordance with the methods described herein.

FIG. 7b schematically shows the expected result 521b when printing using the exemplary printing path as described with reference to FIGS. 6b and 7a. As shown in FIG. 7b, by performing the method for three-dimensional printing described herein it is possible to form sharp apexes—and so the accuracy and fidelity of the zig-zag type pattern layer 21 can be improved.

It is to be understood that any printing path about the first anchor point 202 within the scope of the claims could be taken by the printhead so as to achieve the advantages described herein. For example, there could be any number of intermediate portions.

An anchor point can be returned to during wire frame printing in order to print further sections of material. When returning to an anchor point, the printhead returns to an offset position. That is, a position offset from the centre of that anchor point. For example, the printhead may return to a vertically offset position. This is done in order to avoid collisions between the printhead and the anchor point. This is because the dimensions of an anchor point increase each time it is printed. A counter may be used to maintain a count of how many times an anchor point is returned to. The distance from anchor point to which the printhead returns to can be calculated in dependence on the counter value.

It is to be understood that the methods of wire fame printing described herein may also be applied to the three-dimensional printing of ceramics or metals. For example, rather than a thermo-plastic polymer filament, the printhead may extrude a high viscosity ceramic slurry from a reservoir. Instead of heating a filament to reduce its viscosity, the ceramic slurry may have a component of a volatile liquid, which enables the ceramic slurry to flow sufficiently for extrusion. The volatile liquid may evaporate after printing such that the printed material solidifies.

The methods described herein can be implemented in software. The methods described herein could be performed by an articulated printing robot 310, or any other three-dimensional printing device, executing code that causes the three-dimensional printing device to perform the methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the three-dimensional printing device at which the executable code is supported to perform the tasks specified by the code.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

The invention claimed is:

1. A method of three-dimensional printing, wherein material is printed by a printhead configured to move relative to printed material at a printhead speed and extrude printing material at an extruding speed, the printhead speed and the extruding speed being independently variable, the method comprising:
    printing an initial portion of material from a starting point;
    pausing printing of the initial portion of material so as to form a first anchor point, such that a first direction is defined from the starting point to the first anchor point, and wherein the first anchor point lies in a plane substantially perpendicular to the first direction such that the initial portion of material is on a printed side of the plane;
    resuming printing from the first anchor point by printing, from the first anchor point, two or more intermediate portions of material on a non-printed side of the plane; and
    printing a final portion of material to a second anchor point on the printed side of the plane;
    wherein:
        an average printhead speed is greater than an average extruding speed for a period of time during which the two or more intermediate portions of material and the final portion of material are printed between the first and second anchor points; and
        a first intermediate portion of material of the two or more intermediate portions of material is printed on the opposite side of the initial portion of material to the second anchor point.

2. The method as claimed in claim 1, wherein the printhead and extruding speeds are constant when printing the two or more intermediate portions of material and the final portion of material between the first and second anchor points.

3. The method as claimed in claim 1, the method further comprising:
    pausing the extrusion of material between the first and second anchor points whilst the printhead continues moving.

4. The method as claimed in claim 1, wherein the printing of the initial first portion of material is paused for a predetermined period of time.

5. The method as claimed in claim 1, the method further comprising:
    monitoring a temperature of the first anchor point when printing of the initial portion of material is paused; and
    printing the two or more intermediate portions of material on the non-printed side of the plane after determining that the temperature of the first anchor point is below a threshold.

6. The method as claimed in claim 5, wherein a thermal camera is used to monitor the temperature of the first anchor point.

7. The method as claimed in claim 1, wherein the first direction is substantially vertical.

8. The method as claimed in claim 1, the method further comprising: cooling the first anchor point using one or more fans whilst printing is paused.

9. The method as claimed in claim 1, the method further comprising one or more of:
    printing at least one subsequent portion of material on the first anchor point starting from a position offset from the center of the first anchor point; or
    printing at least one subsequent portion of material on the second anchor point starting from a position offset from the center of the second anchor point.

10. The method as claimed in claim 1, wherein the pausing printing of the initial portion of material so as to form a first anchor point further comprises printing one or more other portions of material, remote from the first anchor point, before returning to the first anchor point so as to resume printing from the first anchor point.

11. The method as claimed in claim 1, wherein the method is a method of three-dimensional wire frame printing.

12. The method as claimed in claim 1, wherein the printhead travels a greater distance when printing the two or more intermediate portions of material and the final portion of material than the direct distance between the first anchor point and the second anchor point.

* * * * *